(12) United States Patent
Lin et al.

(10) Patent No.: US 9,945,424 B2
(45) Date of Patent: Apr. 17, 2018

(54) BEARING THERMAL RELIEF FAN DRIVE GEAR SYSTEM ASSEMBLY METHOD

(71) Applicant: United Technologies Corporation, Hartford, CT (US)

(72) Inventors: Ning Lin, Glastonbury, CT (US); Berci Cherpician, Burlington, CT (US)

(73) Assignee: United Technologies Corporation, Farmington, CT (US)

( * ) Notice: Subject to any disclaimer, the term of this patent is extended or adjusted under 35 U.S.C. 154(b) by 371 days.

(21) Appl. No.: 14/637,452

(22) Filed: Mar. 4, 2015

(65) Prior Publication Data

US 2016/0258488 A1    Sep. 8, 2016

(51) Int. Cl.
| | | |
|---|---|---|
| *F16B 4/00* | (2006.01) | |
| *F16C 43/08* | (2006.01) | |
| *B23P 11/02* | (2006.01) | |
| *F01D 25/16* | (2006.01) | |
| *F16C 35/063* | (2006.01) | |
| *F16C 35/067* | (2006.01) | |
| *F16C 19/52* | (2006.01) | |

(Continued)

(52) U.S. Cl.
CPC ............ *F16C 43/08* (2013.01); *B23P 11/025* (2013.01); *F01D 25/16* (2013.01); *F16C 19/525* (2013.01); *F16C 35/063* (2013.01); *F16C 35/067* (2013.01); *F16D 1/101* (2013.01); *F16B 4/006* (2013.01); *F16B 4/008* (2013.01); *F16C 19/06* (2013.01); *F16C 2226/14* (2013.01); *F16C 2360/23* (2013.01); *F16D 2001/103* (2013.01)

(58) Field of Classification Search
CPC ....... B23P 11/005; B23P 11/025; B23P 11/02; F16C 2226/14; F16C 43/08; F16C 35/063; F16C 19/525; F16C 35/076; F16C 19/06; F16C 2360/23; F16B 4/006; F16B 4/008; F16B 2001/103; F16D 1/101; F16D 1/0858; F16D 2001/103; F01D 25/16

See application file for complete search history.

(56) References Cited

U.S. PATENT DOCUMENTS

| | | | |
|---|---|---|---|
| 3,692,372 | A | 9/1972 | Pineo |
| 4,121,331 | A | 10/1978 | Fukuma et al. |

(Continued)

FOREIGN PATENT DOCUMENTS

| | | |
|---|---|---|
| CN | 103769796 A | 5/2014 |
| EP | 0161081 A1 | 11/1985 |
| WO | 2010/037414 A1 | 4/2010 |

OTHER PUBLICATIONS

Extended European Search Report for EP Application No. 16158812.4 dated Jul. 11, 2016.

(Continued)

*Primary Examiner* — Christopher Besler
(74) *Attorney, Agent, or Firm* — Carlson, Gaskey & Olds, P.C.

(57) ABSTRACT

A method of assembling mating components includes the steps of heating an inner surface of a first cavity of a first part to generate a first expansion, heating an outer surface of a component surrounding an outer periphery of the first part to generate a second expansion of the component that corresponds to the first expansion of the first part, inserting a second part into the first cavity while the first part is in an expanded condition, and cooling the first part to contract around the second part.

7 Claims, 5 Drawing Sheets

(51) Int. Cl.
   *F16C 19/06*   (2006.01)
   *F16D 1/10*    (2006.01)

(56) References Cited

U.S. PATENT DOCUMENTS

| | | |
|---|---|---|
| 4,509,381 A | 4/1985 | Ikemoto et al. |
| 5,580,183 A * | 12/1996 | Brackoneski ........... F01D 5/026 403/24 |
| 7,736,817 B2 | 6/2010 | Arthur et al. |
| 8,662,043 B2 | 3/2014 | Dollinger et al. |
| 8,662,785 B2 | 3/2014 | Hardtle |
| 8,840,359 B2 | 9/2014 | Vick et al. |
| 2009/0272358 A1 | 11/2009 | Schober |
| 2012/0079913 A1* | 4/2012 | Dollinger ............. B21D 53/845 74/567 |
| 2013/0202349 A1 | 8/2013 | Coffin |
| 2013/0323047 A1 | 12/2013 | Van Duyn et al. |

OTHER PUBLICATIONS

European Search Report for European Application No. 17202625.4, dated Jan. 31, 2018.

* cited by examiner

BEARING THERMAL RELIEF FAN DRIVE GEAR SYSTEM ASSEMBLY METHOD

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. A speed reduction device such as a gear assembly may be utilized to drive the fan section such that the fan section may rotate at a speed different than the turbine section so as to increase the overall propulsive efficiency of the engine.

In such engine architectures, a shaft driven by the turbine section provides an input to the gear assembly. The shaft may be constructed from multiple sections assembled together. Assembly of the various shaft sections may be performed utilizing press fits. A press fit assembly may include heating of one part to allow another part to fit therein. Heating to expand one component is complicated if several components are within a heated region. Non-uniform heating of some portions of a shaft interface can induce unwanted stress on parts, such as bearing assemblies. Accordingly, it is desirable to develop an assembly method that enables expansion by the application of heat without damage to surrounding parts.

SUMMARY

In one exemplary embodiment, a method of assembling mating components includes the steps of heating an inner surface of a first cavity of a first part to generate a first expansion, heating an outer surface of a component surrounding an outer periphery of the first part to generate a second expansion of the component that corresponds to the first expansion of the first part, inserting a second part into the first cavity while the first part is in an expanded condition, and cooling the first part to contract around the second part.

In a further embodiment of the above, includes heating the inner surface with a first inductive coil disposed within the first cavity and heating the outer surface of the component with a second inductive coil disposed about the outer surface.

In a further embodiment of any of the above, the first part includes a first shaft including a splined interior surface and the second part includes a second shaft including a splined exterior surface receivable within the splined interior surface of the first part.

In a further embodiment of any of the above, the first shaft includes a coupling shaft for driving a geared architecture and the second shaft includes a shaft driven by a turbine section of a gas turbine engine.

In a further embodiment of any of the above, the component includes a bearing assembly supporting rotation of the first part. The bearing assembly includes an inner race, an outer race and a bearing disposed there
between and the method includes heating the bearing assembly to expand the inner race and outer race in proportion to expansion of the first part.

In a further embodiment of the above, includes a housing supporting the bearing assembly. The method includes application of heat to the housing to generate expansion of the bearing assembly in proportion to expansion of the first part.

In a further embodiment of any of the above, includes detecting expansion with a sensor to determine if a predetermined amount of expansion between the first part and the component has occurred to enable installation of the second part into the first part.

In a further embodiment of any of the above, the first part is heated to a first temperature and the component is heated to a second temperature that is different than the first temperature.

In another exemplary embodiment, a method of mating shaft sections for a gas turbine engine, the method including the steps of assembling a bearing assembly about an outer surface of a first shaft, heating an inner race of the bearing assembly, heating an outer race of the bearing assembly separately from heating of the inner race and at the same time as heating the inner race, inserting a portion of a second shaft into a cavity of the first shaft, and cooling the first shaft, the second shaft, the inner race and the outer race of the bearing assembly such that the first shaft shrinks onto the second shaft.

In a further embodiment of the above, heating the inner race of the bearing assembly includes inserting a heating device into an inner cavity of the first shaft to an axial location corresponding to a position of the inner race on the outer surface of the first shaft and heating the inner race through the inner cavity of the first shaft.

In a further embodiment of any of the above, heating the outer race of the bearing assembly includes positioning a heating device about an outer surface of the outer bearing race and heating the outer bearing race to expand the outer bearing race proportionate to expansion of the inner race.

In a further embodiment of any of the above, including expanding the cavity of the first shaft to provide a fit for a portion of the second shaft.

In a further embodiment of any of the above, an interface between the cavity of the first shaft and an outer surface of the second shaft includes a splined connection.

In a further embodiment of any of the above, including a first inductive heating element received within the first cavity for imparting heat to the first shaft and the inner bearing race and a second inductive heating element disposed about the outer housing.

In a further embodiment of any of the above, including a housing supporting the bearing assembly and heating of the outer bearing race includes heating the housing in an axial location corresponding to an axial position of the outer bearing race.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
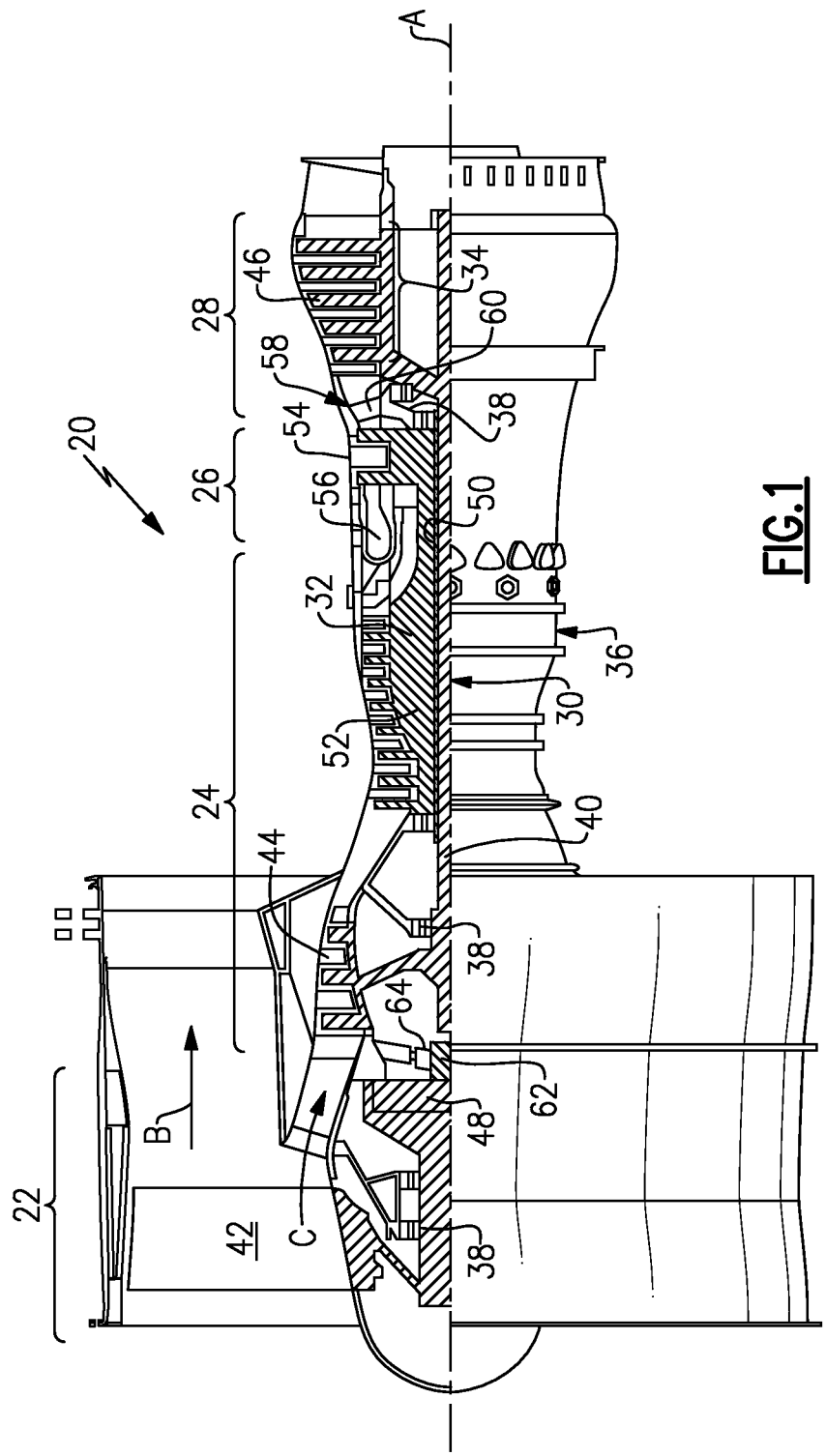
FIG. 1 is a schematic view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/ (518.7° R)]0.5. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine 20 includes the geared architecture 48 that drives the fan section 22. The geared architecture 48 is driven by the turbine section 28 through a shaft 40. A coupling shaft 62 is disposed between the shaft 40 and the geared architecture 48. The coupling shaft 62 includes features that can accommodate movement and misalignment of the shaft 40 relative to the geared architecture 48. The ability to accommodate this misalignment enables the geared architecture 48 to function and increases the efficiency of the geared architecture by reducing the amount of wear that may occur due to misalignment.

An interface between the coupling shaft 62 that transfers power into the geared architecture 48 and the turbine shaft 40 is provided after the low pressure compressor 44 and prior to the geared architecture 48. The coupling shaft 62 is connected to the geared architecture 48. The coupling shaft 62 is supported by a bearing assembly 64. The bearing assembly 64 is mounted outboard of the interface of the shaft 62 and the turbine shaft 40. It should be appreciated that assembly of the coupling shaft 62 to the shaft 40 is provided as a disclosed example, and that the method and structures disclosed are contemplated for use with any interface where two shafts or other structures are assembled together.

Figure 2:
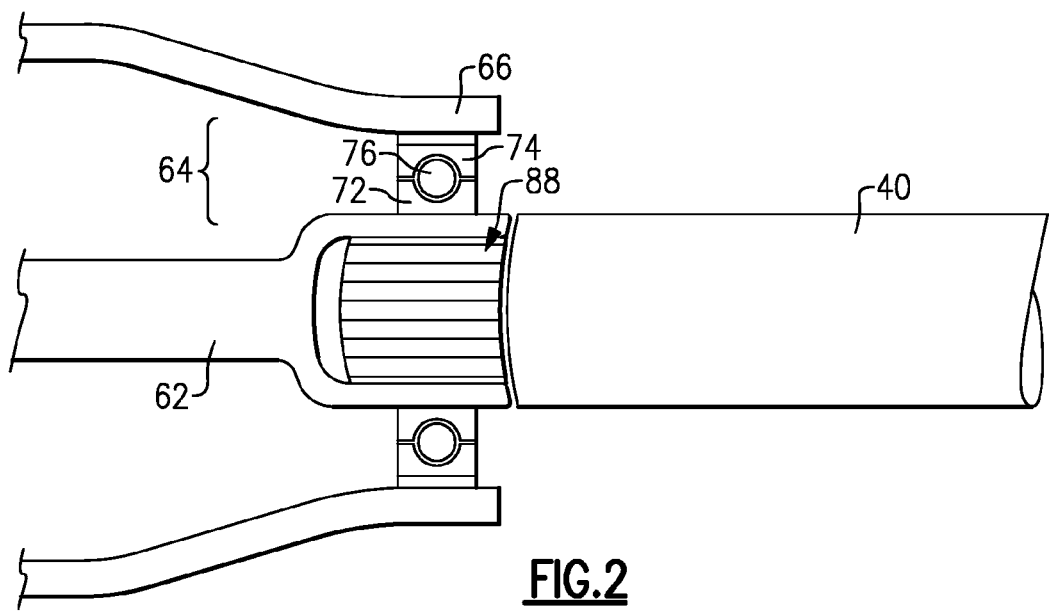
FIG. 2 is a schematic representation of an embodiment of a first shaft component assembled to a second shaft
Figure 5:
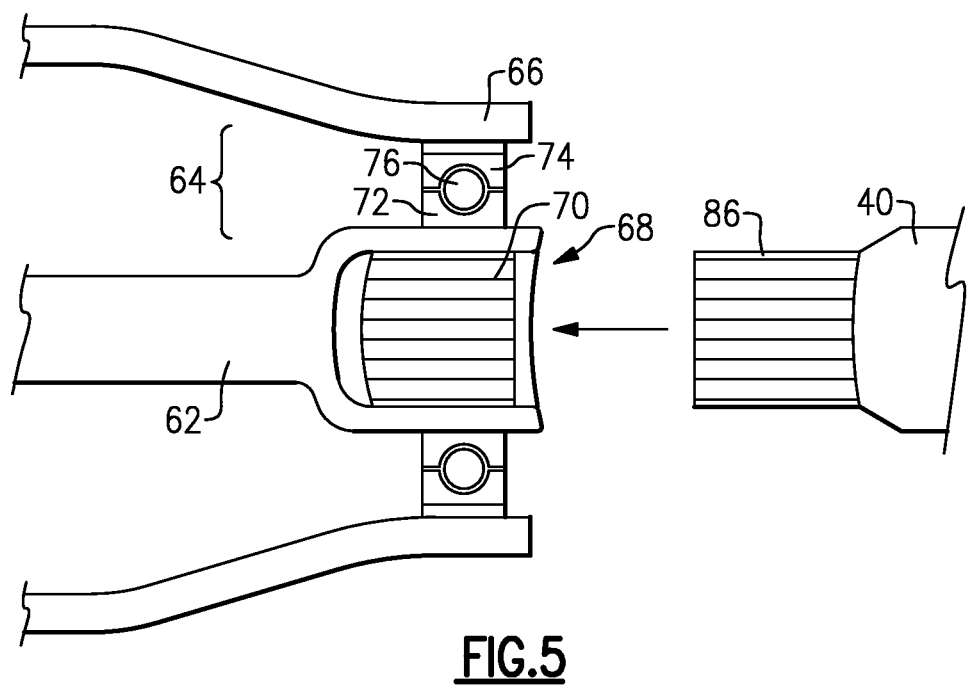
FIG. 5 is a schematic representation of the mating step between first and second shaft components.

Referring to FIG. 2 with continued reference to FIG. 1, the shaft 40 is coupled to the coupling shaft 62 through a splined interface 88. In this example, the shaft 40 includes splined portion 86 (FIG. 5) disposed about an outer surface of a portion of the shaft 40. The coupling shaft 62 includes an inner cavity 68 that includes a plurality of interior splines 70 (FIGS. 3 and 5) that mate with the splined portion 86 on the shaft 40. Assembly of the shafts is provided as a tight press fit sometimes referred to as a snap fit. The press fit between the shaft 40 and the coupling shaft 62 is accomplished by heating the coupling shaft 62 to expand the cavity 68 that enables insertion of the splined portion 86 of the shaft 40.

The assembly sequence for assembling the gas turbine engine requires that a bearing assembly 64 is first assembled to an outer surface of the coupling shaft 62. In this example, the bearing assembly 64 includes an inner race 72 that is supported on an outer surface of the coupling shaft 62. The bearing assembly 64 further includes an outer race 74 and a bearing 76 disposed between the inner and outer races 72, 74. The bearing 76 may include bearings disposed within a cage. The outer race 74 is in turn supported by a housing 66. The housing 66 supports the bearing assembly 64 that in turn supports rotation of the coupling shaft 62.

Heating of this complex stack of parts complicates the assembly process. Heating the coupling shaft 62 causes a thermal expansion. Because the inner bearing race 72 and the outer bearing race 74 are not uniformly heated, they do not expand in a uniform manner and can induce stresses on and between the inner race 72 and the outer race 74. The non-uniform heating can induce undesired stresses on the bearing assembly.

Accordingly, the example method provides steps for expanding the coupling shaft 62 to receive a portion of the turbine shaft 40 without damaging or otherwise imparting undue stresses and strains on the example bearing assembly 64. The temperature range is defined to provide a desired temperature differential that is does not damage the bearing assembly 64.

Figure 3:
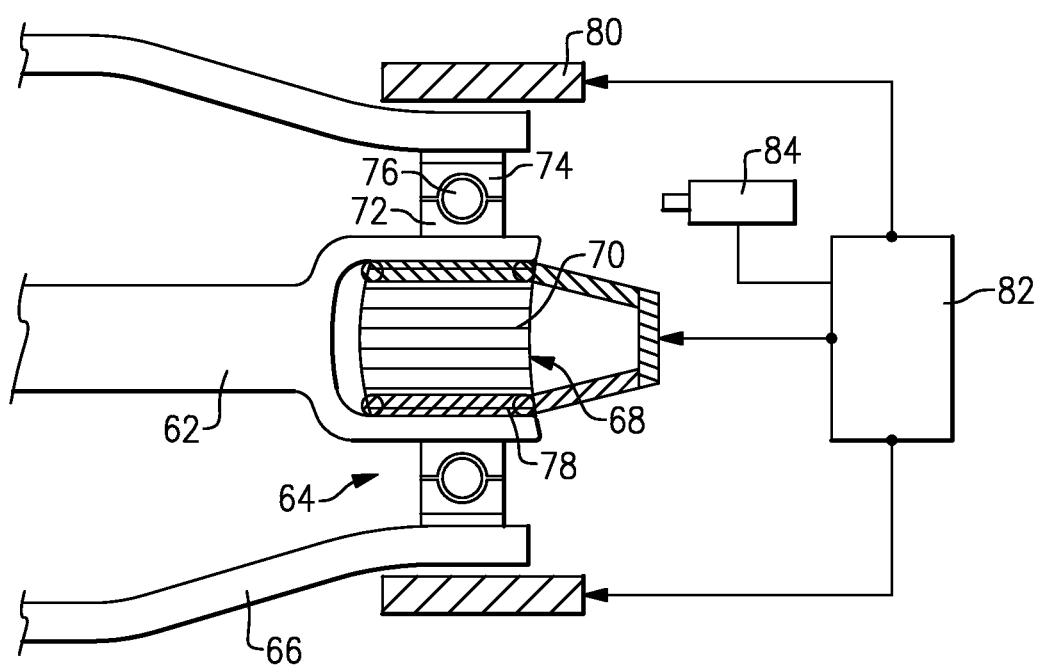
FIG. 3 is a schematic view of an example method of mating two shaft parts together.
Figure 4:
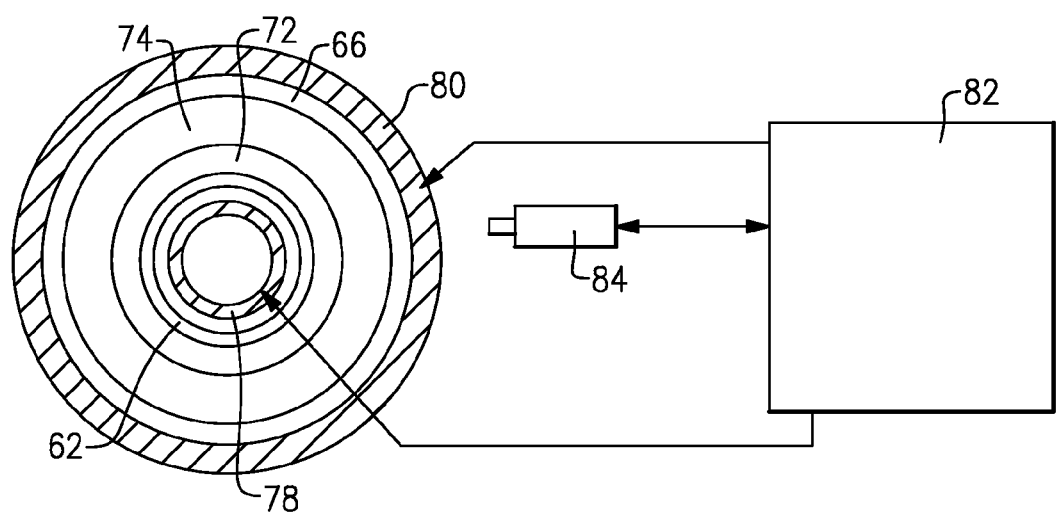
FIG. 4 is another schematic representation of an embodiment of a heating step for assembly two shaft components.

Referring to FIG. 3 with continued reference to FIG. 1, the example method begins by inserting inductive coils 78 into the cavity 68 of the coupling shaft 62. A second set of inductive coils 80 are disposed about an outer surface of the housing 66 at an axial location that corresponds to the position of the bearing assembly 64 on the coupling shaft 62. A power source 82 powers the inductive coils 78, 80. It should be understood that inductive coils 78, 80 are shown by way of example, and other heating devices and structures could be utilized and are within the contemplation of this disclosure.

The disclosed example assembly method includes the initial step of assembling the bearing assembly 64 to the outer surface of the coupling shafts 62. The interior inductive coil 78 is then inserted into the cavity 68 of the coupling shaft 62. In this example, the inner cavity 68 includes the splines 70 that mate with the corresponding splined portion 86 of the shaft 40. An outer or second inductive coil 80 is placed against the housing 66 at an axial location proximate to the bearing assembly 64. Application of heat with both the inner and outer inductive coils 78, 80 provides a uniform thermal expansion of the coupling shaft 62 and the bearing assembly 64.

The second inductive coil 80 heats the housing 66 and also the outer bearing race 74 such that the coupling shaft 62, the inner bearing race 72 and the outer bearing race 74 are all expanded uniformly. The shaft 62 may be of a different material than the material utilized for the bearing races 72, 74 and therefore include different thermal properties. Accordingly, the specific energy and heat induced by the second conductive coil 80 may be different than the heat induced by the first inductive coil 78. In this example, heat imparted into the coupling shaft 62 and the inner and outer bearing races 72 and 74 is matched to provide a uniform amount of the thermal expansion that does not incur undue stresses on any of the components. The amount of thermal expansion is dependent on the thermal properties of each of the components and therefore the heat induced by the first coil 78 may be different than the heat induced by the second coil 80. Moreover, the second coil 80 may impart an increased amount of heat to expand the outer race 74 in a manner that will relieve stresses and not impart undue strain on the bearings 76 that is disposed between the inner and outer races 72, 74.

A sensor 84 is disposed proximate to the coupling shaft 62 and bearing assembly 64. The sensor 84 can be utilized to detect a range of expansion to determine if the coupling shaft 62 is expanded sufficiently to receive the shaft 40 or the sensor 84 may be utilized to determine when a specific temperature has been obtained by each of the components. As appreciated, a specific temperature can be correlated with a desired expansion rate and thereby determining a temperature of a specific component can provide information indicative of the amount of expansion that has occurred.

Once the coupling shaft 62 is expanded to a desired diameter determined to provide for acceptance of the splined portion 86, the inductive coils 78 and 80 are removed and the spline portion 86 of the shaft 40 is inserted into the cavity 68. It should be understood that although a splined interface is disclosed, other interfaces as are known within the art are within the contemplation of this disclosure.

Once the shaft 40 is inserted into the coupling shaft 62, the shafts 40, 62 and bearing assembly 64 are cooled such that coupling shaft constricts around the shaft 40 to form a snap or tight press fit. The tight press fit is desirable as it provides for a secure inner connection between the torque transferring shafts.

Accordingly, the example method of assembling mating shaft components enables assembly of two shaft components in complex tolerance stack up conditions.

Although an example embodiment has been disclosed, a worker of ordinary skill in this art would recognize that certain modifications would come within the scope of this disclosure. For that reason, the following claims should be studied to determine the scope and content of this disclosure.

What is claimed is:
1. A method of mating shaft sections for a gas turbine engine, the method comprising the steps of:
assembling a bearing assembly about an outer surface of a first shaft;
heating the first shaft and an inner race of the bearing assembly;

heating an outer race of the bearing assembly separately from heating of the first shaft and the inner race and at the same time as heating the first shaft and the inner race;

inserting a portion of a second shaft into a cavity of the first shaft; and cooling the first shaft, the second shaft, the inner race and the outer race of the bearing assembly such that the first shaft shrinks onto the second shaft.

2. The method as recited in claim 1, wherein heating the inner race of the bearing assembly comprises inserting a heating device into an inner cavity of the first shaft to an axial location corresponding to a position of the inner race on the outer surface of the first shaft and heating the inner race through the inner cavity of the first shaft.

3. The method as recited in claim 1, wherein heating the outer race of the bearing assembly comprises positioning a heating device about an outer surface of the outer bearing race and heating the outer bearing race to expand the outer bearing race proportionate to expansion of the inner race.

4. The method as recited in claim 1, including expanding the cavity of the first shaft to provide a fit for a portion of the second shaft.

5. The method as recited in claim 4, wherein an interface between the cavity of the first shaft and an outer surface of the second shaft includes a splined connection.

6. The method as recited in claim 1, including a first inductive heating element received within the first cavity for imparting heat to the first shaft and the inner bearing race and a second inductive heating element disposed about the outer housing.

7. The method as recited in claim 1, including a housing supporting the bearing assembly and wherein heating of the outer bearing race comprises heating the housing in an axial location corresponding to an axial position of the outer bearing race.

* * * * *

UNITED STATES PATENT AND TRADEMARK OFFICE
CERTIFICATE OF CORRECTION

PATENT NO. : 9,945,424 B2
APPLICATION NO. : 14/637452
DATED : April 17, 2018
INVENTOR(S) : Ning Lin and Berci Cherpician Page 1 of 1

It is certified that error appears in the above-identified patent and that said Letters Patent is hereby corrected as shown below:

In the Claims

In Claim 6, Column 8, Line 12; replace "the outer housing" with --the outer race--

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*